United States Patent

Burgsmüller

[11] 3,966,348
[45] June 29, 1976

[54] DEVICE FOR TAPPING BORES

[76] Inventor: Karl Burgsmüller, Haus Hainberg, 3350 Kreiensen, Germany

[22] Filed: Oct. 11, 1974

[21] Appl. No.: 514,325

[52] U.S. Cl. .............................. 408/180; 10/129 R; 10/139 R
[51] Int. Cl.² ..................... B23G 1/04; B23G 1/48
[58] Field of Search ............ 10/89 R, 101, 129 R, 10/139 R; 408/153, 173, 178, 180, 129

[56] References Cited
UNITED STATES PATENTS

| 521,922 | 6/1894 | Stevenson | 10/101 |
|---|---|---|---|
| 1,782,633 | 11/1930 | Schlitz | 10/89 F |
| 1,791,532 | 2/1931 | Oberly et al. | 10/129 R |
| 2,157,248 | 5/1939 | Swanson | 408/180 |
| 2,295,135 | 9/1942 | Smith | 408/180 |
| 2,734,402 | 2/1956 | Hoern | 408/180 |
| 3,661,470 | 5/1972 | O'Pry | 10/139 |
| 3,812,763 | 5/1974 | Neshumaev et al. | 408/180 |

FOREIGN PATENTS OR APPLICATIONS

| 712,787 | 7/1965 | Canada | 408/180 |
|---|---|---|---|
| 472,744 | 0000 | Italy | 10/129 R |

Primary Examiner—C. W. Lanham
Assistant Examiner—E. M. Combs
Attorney, Agent, or Firm—Michael J. Striker

[57] ABSTRACT

A spindle carrying at its free end one or more transversely extending thread cutters is coaxially inserted into a bore of a workpiece, so that the cutter or cutters will be spaced from the bore wall. An arrangement is provided for rotating the spindle, and another arrangement for tilting the spindle to a position in which it extends skew to the axis of the bore so that the cutter engages and cuts into the bore wall. A further arrangement gradually axially retracts the rotating spindle outwardly of the bore, so that during such retraction the cutter cuts threads into the bore wall.

19 Claims, 2 Drawing Figures

DEVICE FOR TAPPING BORES

BACKGROUND OF THE INVENTION

The present invention relates to a device for tapping bores, especially for tapping blind bores such as are often found at the parting line between two components.

There are many instances where blind bores must be tapped. One of these instances is in the case where the blind bores are provided at the parting line between two components, for instance between two halves of a reactor housing, two halves of a turbine housing or the like, where one of the halves must be provided with blind bores while the other half is provided with open-ended bores through which bolts are inserted to be threaded into the blind bores. The diameters of the tapped threads in blind bores, especially of halves of turbine housings, reactor housings or the like, are usually on the order of between substantially 60 and 130 millimeters diameter, the threaded having a pitch of between 6 and 9 millimeters. It is the present practice of the industry to tap such bores with expensive specialty taps. The tapping can be carried out only very slowly and frequently the chips of material which are dislodged during the tapping and which become crowded into the flutes of the tap, especially as the tap begins to approach the bottom of the blind bore, cause the tap to break. Moreover, such bores must be provided with a hole expansion which makes the formation of the threads even more difficult and expensive than it already is, and which tends to weaken the workpiece in addition.

Furthermore, there is always the danger that the tap may not run strictly coaxially with the previously drilled bore if the tap is supported on and rotated by one of the conventional drilling machines having an arm that is swung from a position laterally of the workpiece over the latter. In this case it is well possible that the workpiece may have to be discharged.

SUMMARY OF THE INVENTION

It is an object of the present invention to provide an improved method of tapping bores, especially but not exclusively of blind bores.

A further object of the invention is to provide a device for carrying out the method.

Another object of the invention is to provide for such a method and a device with which the tapping of bores can be carried out in a simpler, more reliable and less expensive manner than was theretofore possible.

In keeping with these objects, and with others which will become apparent hereafter, one feature of the invention resides in a method of tapping a bore which comprises the coaxial insertion into the bore through an open end thereof of a spindle that carries a transversely extending cutter having clearance from the bore wall. The spindle is driven in rotation and is tilted so that it extends skew to the axis of the bore and so that the cutter engages and cuts into the bore wall. Thereupon, the rotating spindle is gradually retracted in direction outwardly of the open end of the bore, so that the cutter during such retraction cuts threads into the bore wall.

The device for carrying out the present invention comprises a spindle having a free end portion provided with a transversely extending bore, means for inserting the free end portion coaxially into a bore so that the cutter becomes located in the bore with clearance from the bore wall, means for rotating the spindle, means for tilting the spindle to a position in which it extends skew to the axis of the bore and the cutter engages and cuts into the bore wall, and means for gradually axially retracting the rotating spindle outwardly of the bore, so that during such retraction the cutter cuts threads into the bore wall.

The device according to the present invention is a freely movable device which can be lowered onto the workpiece by a crane or the like so as to be positioned on the workpiece in readiness for the free end portion of the spindle to be coaxially inserted into the bore hole which has been previously drilled in the workpiece.

Particularly if the invention is employed in connection with the tapping of a blind bore, the fact that the tapping takes place in direction from the region of the inner end of the bore towards the outer end of the bore, which is opposite to the industry practice, the space available for the chips that become dislodged by the cutter becomes increasingly greater as the cutter moves towards the open end of the bore. This is again in contradistinction to what is known from the art where, as the cutter moves from the open end of the bore towards the closed bottom end thereof, the chip room becomes increasingly smaller and the chips become more and more forced into the flutes of the conventionally used taps, causing the same to break. Because the chip room in the present invention becomes increasingly larger as the cutting proceeds, the forces acting upon the cutter or cutters (there may be one or more provided on the free end portion of the spindle) are significantly reduced and never become large enough to do any damage to the cutter or cutters. Hole expansion is no longer necessary, and of course the workpiece —which in some instances may be exceedingly heavy— need not be moved and transported to the location of the drilling machine or tapping machine, as was previously the case, but instead the device according to the present invention can readily be transported to the workpiece. Furthermore, there are no problems with the previously necessary precise orientation of the workpiece relative to the tapping machine since it is a simple matter to locate the device according to the present invention relative to the workpiece wherever desired, and to orient it in any desired manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
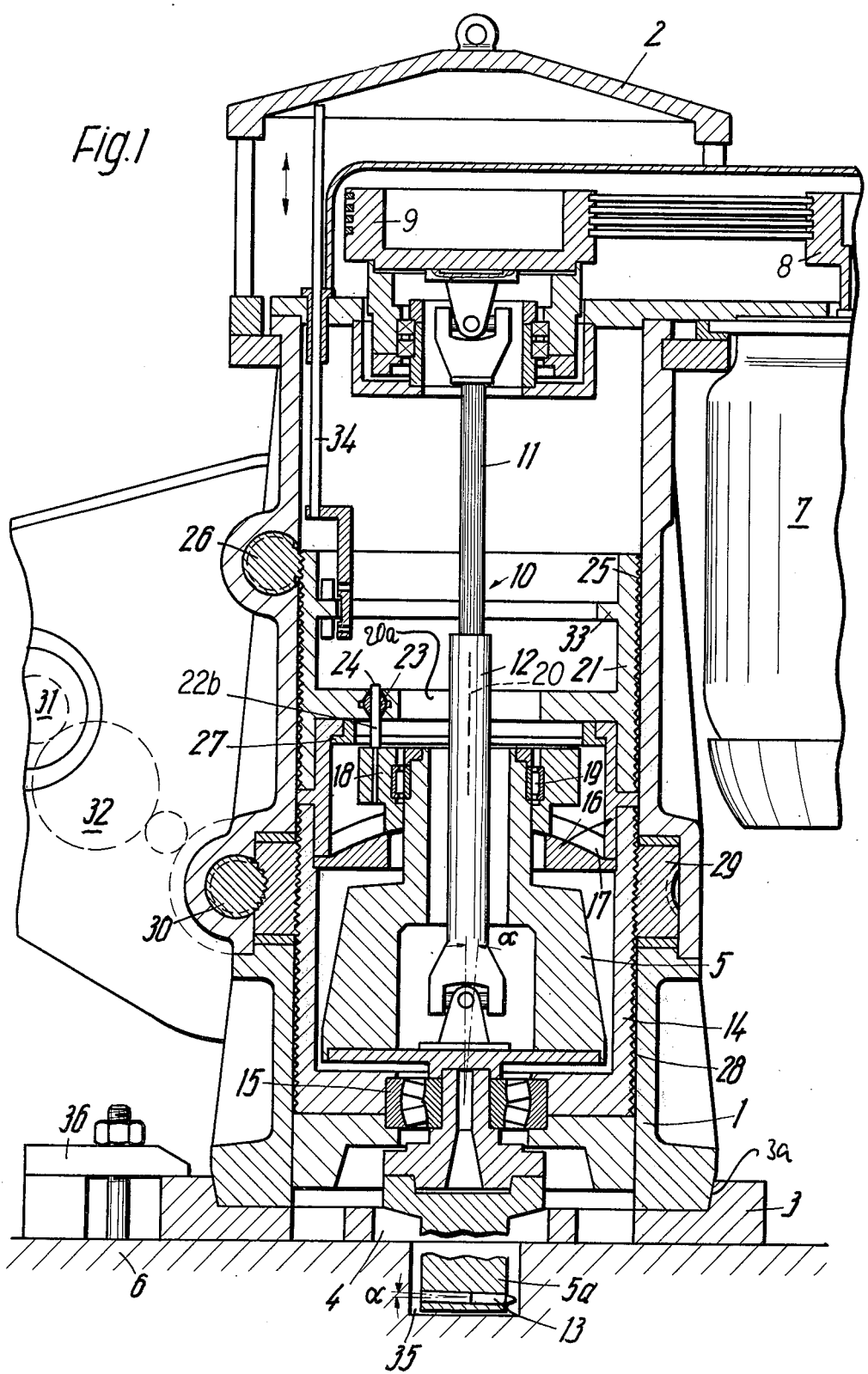
FIG. 1 is a vertical section in somewhat digrammatic form, illustrating an embodiment of a device according to the present invention.
Figure 2:
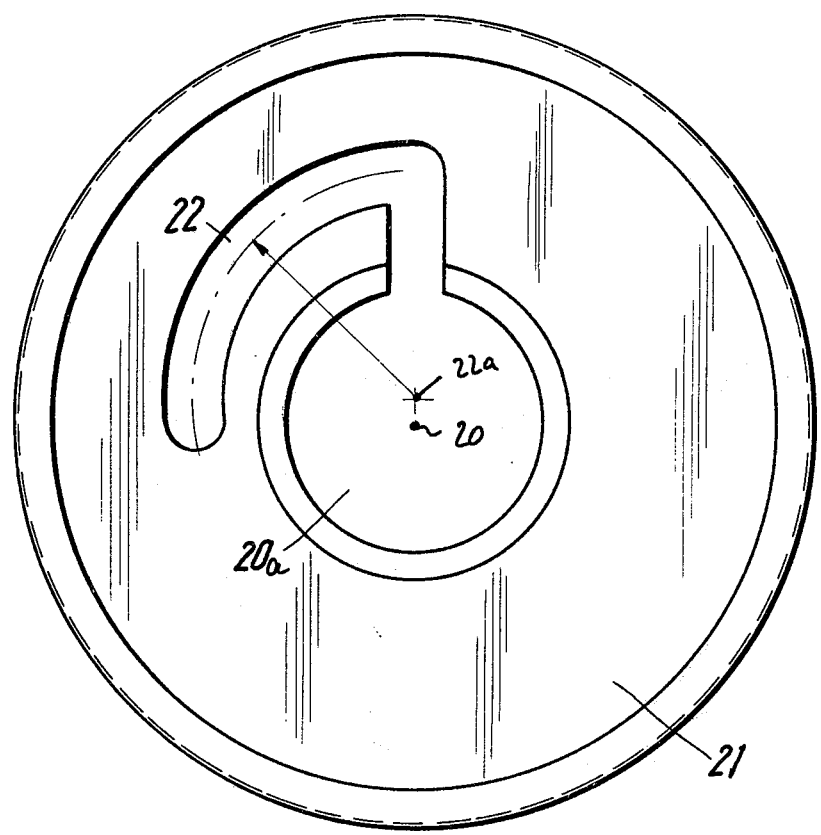
FIG. 2 is a top-plan view of one of the elements of the device in FIG. 1.

Referring to the drawing in detail, which shows in FIGS. 1 and 2 a single exemplary embodiment of the invention, it will be seen that reference numeral 1 identifies a housing which is provided with its upper end with a suspending arrangement 2 so that it can be suspended from a crane, lift or the like. The lower open end of the housing is of annular configuration and is insertable into a corresponding configurated recess 3a of a centering plate 3 which in turn is to be placed upon the workpiece 6 having the bore 35 which is to be tapped. The bore is of course previously formed, as by drilling, and this forms no part of the invention. The plate 3 could be of one piece with the housing 1, but in this embodiment is a discrete separate element which has a center opening 4 through which a rotary spindle 5 can extend into the bore 35.

Mounted on the housing 1 is an electric motor 7 which drives a cardan shaft 10 via pulleys 8, 9 and associated belts. A different drive could of course also be envisioned. The shaft 10 is composed of a splined male portion 11 and an internally splined female portion 12 which can be telescoped together to greater or lesser degrees, so that the overall vertical length of the shaft 10 can be increased or decreased. The shaft 10 is connected with the upper end of the spindle 5 in order to drive the latter in rotation. It is evident that the shaft 10 is appropriately journalled at its upper end, as illustrated. It is also clear from FIG. 1 that the lower free end portion of the spindle 5 carries a removable tool holder 5a which is conventional and which in turn carries one or more (one shown) transversely projecting cutters in form of cutting steels 13.

A sleeve 14 has external threads and is threaded into the internally threaded housing 1. The sleeve 14 carries a self-aligning radial bearing 15 in which the spindle 5 is journalled so that it can be tilted with reference to the vertical, that is with reference to the axis of the bore 35. In other words, the spindle 5 can be tilted with reference to the vertical by some degrees so as to extend skew to the axis of the bore 35 which is to be internally tapped. An arcuate guide 16 is provided in the upper portion of the sleeve 14, centrally surrounding the cardan shaft 10 but out of engagement with it; the guide 16 is fixedly connected with the sleeve 14 and is formed with a central groove 17 of dovetail-shaped cross section. An adjusting ring 18 having a downwardly facing concave side is seated on the guide 16, or rather on the upwardly convex side of the guide 16, having portions which extend into the groove 17 so that the ring 18 cannot turn with reference to the guide 16 but can slide relative to the guide 16 along the groove 17. The spindle 5 is formed in its upper part as a hollow flywheel, and this upper part is turnably journalled in the ring 18 via a needle bearing 19. Thus, when the ring 18 slides along the groove 17 of the guide 16, the spindle 5 will be moved skew with reference to the longitudinal axis of the bore 35. Each of the cutting steels 13 carried by the lower end portion of the spindle is inclined downwardly with reference to the horizontal by the illustrated angle $\alpha$ which corresponds to the angle through which the axis of the spindle 5 can be displaced with reference to the vertical (compare FIG. 1).

A control drum 21 is provided above the sleeve 14, being supported on the latter and threaded into the housing 1, and being turnable about the central axis 20 of its central opening 20a. As FIG. 2 shows more clearly, the transverse wall of the drum 21 is formed with an eccentric cam groove 22 whose center of curvature is indicated at 22a. A follower 22b provided on the ring 18 extends into the groove and carries a spherical member 23 which actually is located within the groove 22. The vertical teeth on the outer circumference of the drum 21 are identified with reference numeral 25 and are engaged by an hour-glass worm 26 which, when driven in rotation, causes the drum 21 to rotate about its central axis 20. An undercut ring 27 is threadedly connected with the lower side of the drum 21 and extends beneath a shoulder formed at the upper end of the guide 16 which is fixedly connected with the sleeve 14, thus holding the drum 21 and the sleeve 14 together for joint rotation.

An interiorly threaded ring 29 is threaded on the exterior threads 28 of the sleeve 14 and in turn is provided with exterior threads configurated as the threads of a worm gear which mesh with a worm 30 that is mounted in the housing 1 for rotation. The ring 29 is so mounted in the housing 1 —due to the shoulders which engage it at its opposite axial ends— that it can turn in the housing but cannot shift axially of the latter. A diagrammatically illustrated motor 31 is provided which drives the work 30 via an interposed change-gear drive 32 so that particular gears may be selected to obtain different thread pitches as will be explained below. A corresponding drive is provided to drive the worm 26 from the motor 31.

The drum 21 is provided with a ring flange 33 which extends in inward direction and which is engaged by an indicator device 34 which provides at the upper end of the housing 1 an indication of the distance to which the spindle 5 has been raised or lowered, thus making it possible to determine to what extent the spindle 5 has been inserted into the bore 35, which indication then serves to tell the operator when to begin the actual tapping operation.

In use of the device according to the present invention, the explanation of which will also make clear the currently preferred method of the invention, the centering plate 3 is placed onto that surface of the workpiece 6 wherein the bore 35 that is to be tapped is provided. The bore 4 of the centering plate 3 is now so arranged that it is coaxial with the bore 35, an operation which may be carried out with the aid of a gauge or the like. Once the centering plate 3 is in the proper position it is secured to the workpiece 6 by means of one or more holding devices, for example the illustrated clamping shoes 36. These clamping shoes have bolts which may be threaded into already existing tapped bores of the workpiece or which can be otherwise secured to the workpiece. It is possible to provide more than one of the centering plates 3 so that while one of them is in use with the remainder of the device for tapping a bore 35, a second and possibly additional ones of the centering plates 3 can be placed in proper position for tapping of the further bores. This saves time and increases the economy of operation.

When the plate 3 is in position and is firmly secured, a crane or the like from which the device of FIGS. 1 and 2 is suspended lowers the device until the lower end of the housing 1 is seated in the depression 3a of the plate 3. At this time the spindle 5 is still upwardly retracted in the device, the portions 11 and 12 of the card and shaft 10 being telescoped together. The cutting steels 13 are located at or just within the upper open end of the bore 35 but out of engagement with the bore wall. The spindle 5 is now lowered into the bore 35 while the operator watches the indicator device 34 which will tell him when the desired depth has been reached, that is when the spindle 5 has been lowered to the desired depth into the bore 35. At this time the motor 7 may already be energized and the spindle 5 may already rotate; this is not disadvantageous because the cutting steels 13 are out of engagement with the bore wall.

Once the spindle 5 has been lowered into the bore 35 to the desired depth, the motor 31 is energized to drive the worm 26. The worm 26 in turn rotates the drum 21 about the vertical axis of rotation 20 thereof, through approximately 90° initially. It will be understood that for this purpose the direction of rotation of the reversible electromotor 31 is opposite to the direction of rotation which was employed for lowering the spindle 5 into the bore 35 subsequent to the positioning of the housing 1 on the centering plate 3. As the drum 21 turns through the initial 90° angle this motion is transmitted via the follower 24 that is guided in the cam groove 22 to the ring 18 which thus is caused to shift in one or the opposite direction along the groove 17 of the guide 16, thus causing the longitudinal axis of the spindle 5 to be tilted approximately through the angle α with reference to the vertical, so that the longitudinal axis of the spindle 5 now extends skew to the axis of the bore 35. This tilting movement brings the cutting steels 13 into contact with the bore wall bounding the bore 35 and causes them to cut into the bore wall to the desired cutting depth for the thread.

In order now to produce the thread, that is to tap the bore 35, the sleeve 14 and the drum 21 are continuously rotated in a sense retracting them upwardly in FIG. 1. During this movement the length of the shaft 10 decreases as the portions 11 and 12 telescope together. The rotation of the sleeve 14 and drum 21 results from the drive of the sleeve 14 via the worm 26, the drum 21, the follower 24, the ring 18 and the flue 17. Thus, the sleeve 14 becomes continuously retracted in upward direction in the ring 29. The pitch of the thread that is being cut during this movement into the wall of the bore 35 is dependent upon the pitch of the external thread 28 of the sleeve 14.

However, it should be understood that the pitch can be varied, for which purpose the motor 31 is made to drive the change gear 32 to thereby turn the worm 30 which in turn rotates the ring 29, so that the rotation of the ring 29 becomes superimposed upon the rotation of the sleeve 14, thus varying the pitch of the threads being cut, in dependence upon the rotational speed selected for the worm 30 and the ring 29 with the change-speed gear 32.

It will be appreciated that modifications are possible in the illustrated exemplary embodiment, without departing from the sense and intent of the invention. For instance, the drum 21 could be replaced by a different component as long as this component performs the same function as the drum 21. The connection between the ring 18 and the drum 21 might be different from that which has been illustrated by way of example. The closed end of the cam groove 22 might be provided with an adjustable abutment which can be shifted lengthwise of the cam groove 22, so as to make it possible for an operator to select the extent to which the follower 24 can move in the cam groove 22, and thus the magnitude of the angle α. It is also possible to use a drive other than an hourglass or globoid screw to rotate the drum 21. I have found it advantageous if the convex surface of the guide 16 forms a segment of a cylinder the center of curvature coincides with the axis of rotation of the bearing 15, and more particularly with a point on the axis of rotation midway between the opposite axial ends of the bearing 15. It would similarly be possible to omit the change-speed gear 32 and the worm 30 if the device is intended to be used for only one type of thread, that is if the thread that is to be cut is always to have the same pitch. Of course, if the pitch must be varied, then the elements 30 and 32 or equivalent means will be required.

It is also evident that if desired, two separate motors could be provided, the motor 31 for driving the worm 26, and a separate motor for driving the worm 30 via the change-speed gear 32. However, it is simpler and currently preferred if a single motor 31 serves both purposes. It goes without saying, of course, that when the pitch of the thread that is to be formed in the bore 35 is to correspond to the pitch of the thread 28 on the sleeve 14, the ring 29 will not be rotated by the worm 30; this possibility is employed only when the pitch of the thread to be cut is to be different from the pitch of the thread 28.

It will be understood that each of the elements described above, or two or more together, may also find a useful application in other types of constructions differing from the types described above.

While the invention has been illustrated and described as embodied in a device for tapping bores, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention and, therefore, such adaptations should and are intended to be comprehended within the meaning and range of equivalence of the following claims.

What is claimed as new and desired to be protected by Letters Patent is set forth in the appended claims.

1. A device for tapping bores, especially blind bores, comprising a tubular housing; a spindle journalled at one end thereof inside said housing and having free the other end thereof, said spindle being rotatable in, and axially shiftable along the axis of, said housing; a transversely extending cutter provided at the free end of said spindle; an opening in the bottom of said housing permitting the free end of said spindle to project outside the housing when the spindle is shifted in axial direction; means engageable with the bottom of said housing arranged to align the axis of said housing with the axis of said bore and thus to secure a correct axial introduction of the free end of said spindle into said bore so that said cutter becomes located in the bore with clearance from the bore wall; means for rotating said spindle; means inside said housing cooperating with said spindle for tilting the same to a position in which in extends skew to the axis of the bore and engages the wall thereof to cut, when the spindle is rotated, into the bore wall; and means inside said housing providing for gradually axially retracting the rotating spindle outwardly of said bore in dependence on the rotation speed of said spindle so that the rotation of the spindle combines with said retraction and the cutter cuts ascending threads into the bore wall.

2. A device as defined in claim 1, wherein said means for aligning the axis of said housing with the axis of said bore comprises an apertured positioning plate engageable with said housing at its open bottom and having a surface adapted to be placed against a workpiece which is formed with a bore to be tapped.

3. A device as defined in claim 2, wherein said tilting means comprises a guide element located transversely inside said housing and having a convex surface formed with a groove which extends transversely of the axis of rotation of said spindle; a guide ring formed with a central opening for passage therethrough of said spindle and with a concave surface seated on said convex surface; a guide means guiding said guide ring for tilting movement relative to said guide element along said groove; journalling means journalling said spindle in said center opening of said guide ring for rotation; and shifting means for shifting said guide means in said groove and effecting tilting of said guide ring.

4. A device as defined in claim 3, wherein said shifting means comprises a drum turnably mounted in said housing coaxially with opening and formed with a transverse wall having an eccentric curved cam track, a motor for rotating said drum about the drum axis, and a follower on said guide ring which extends into said cam track.

5. A device as defined in claim 4, wherein said follower includes a spherical portion which is located in and guided by said cam track.

6. A device in claim 4, wherein said drum is formed on an outer circumferential surface with circumferentially extending screw threads; and wherein said retracting means comprises a worm gear mounted on said housing and meshing with said screw threads so that said drum is turned by said worm gear and simultaneously moves axially of said bore.

7. A device as defined in claim 6, wherein said worm gear is an hour-glass worm gear.

8. A device as defined in claim 3; further comprising a self-aligning radial bearing coaxial with said journalling means and journalling said spindle at a location which is axially spaced from said journalling means.

9. A device as defined in claim 8, wherein said convex surface is shaped as a section of a cylinder having a central axis which intersects the axis of rotation of said radial bearing midway between the axial ends of the bearing.

10. A device as defined in claim 4; and further comprising means for setting the pitch of screw threads which are being cut by said cutter.

11. A device as defined in claim 10, wherein said setting means comprises an exteriorly threaded sleeve surrounding said spindle and connected for rotation with said drum; an interiorly threaded ring surrounding said sleeve and mounted in said housing, the interior threads of said ring meshing with the threads on said sleeve; a worm mounted in the housing for rotation, said worm meshing with the exterior threads of said ring; said ring being mounted with freedom of rotation about said sleeve but fixed against axial displacement.

12. A device as defined in claim 11; and further comprising means for varying the pitch of the screw threads being cut.

13. A device as defined in claim 12, wherein said varying means comprises worm threads on an outer circumferential surface of said ring, a worm gear meshing with said worm threads, and a change-gear mechanism operatively connected with said worm gear for rotating the same at different selectable speeds.

14. A device as defined in claim 1, wherein said rotating means comprises a cardan shaft composed of a splined female shaft portion and a splined male shaft portion telescoped into said female shaft portion so that the length of said cardan shaft may change in response to telescoping of said shaft portions, one of said shaft portions being connected to said spindle and the other of said shaft portions being journalled for and driven in, rotation.

15. A device as defined in claim 2, wherein said positioning plate is a discrete annular member.

16. A device as defined in claim 1; further comprising a component which is axially movable with said spindle; and indicating means cooperating with said component for indicating the distance by which said free end portion of said spindle is spaced from a fully retracted position thereof.

17. A device as defined in claim 1, wherein said spindle has a vertical orientation and is tiltable skew to said axis of the bore through a predetermined maximum angle; and wherein said cutter is inclined to the horizontal in direction forwardly of said free end portion by substantially said maximum angle.

18. A device as defined in claim 1, wherein said spindle has a vertical orientation and includes a lower part provided with said cutter, and an upper part constructed as a hollow fly wheel.

19. A device as defined in claim 13, wherein said worm driving said sleeve and said worm gear driving said ring are actuably connected to the means rotating said spindle.

* * * * *